United States Patent [19]

Vetter et al.

[11] 4,235,834
[45] Nov. 25, 1980

[54] METHOD FOR MAKING BIAXIALLY STRETCHED ARTICLES OF THERMOPLASTIC RESIN

[75] Inventors: Heinz Vetter, Rossdorf; Ernst Friederich, Darmstadt; Karl-Heinz Schanz, Traisa, Darmstadt; Hartmut Schikowsky, Darmstadt, all of Fed. Rep. of Germany

[73] Assignee: Röhm GmbH, Darmstadt, Fed. Rep. of Germany

[21] Appl. No.: 877,283

[22] Filed: Feb. 13, 1978

[30] Foreign Application Priority Data

Feb. 17, 1977 [DE] Fed. Rep. of Germany ....... 2706688

[51] Int. Cl.³ .......................... B29C 17/02; B29D 7/24
[52] U.S. Cl. .................................. 264/290.2; 264/130;
  264/210.3; 264/210.7; 264/280; 264/291
[58] Field of Search .................. 264/289, 280, 210 R,
  264/216, 175, 209, 130, 291, 290.2, 210.3, 210.7

[56] References Cited

U.S. PATENT DOCUMENTS

| | | | |
|---|---|---|---|
| 2,618,012 | 11/1952 | Milne | 264/289 |
| 3,083,410 | 4/1963 | McGlamery | 264/289 |
| 3,290,420 | 12/1966 | Orser | 264/210 R |
| 3,370,111 | 2/1968 | Boone | 264/289 |
| 3,504,075 | 3/1970 | Williams, Jr. et al. | 264/210 R |
| 3,852,387 | 12/1974 | Bortnick et al. | 264/175 |
| 4,085,187 | 4/1978 | Jenks et al. | 264/175 |

Primary Examiner—James B. Lowe
Attorney, Agent, or Firm—Curtis, Morris & Safford

[57] ABSTRACT

A method is disclosed for biaxially stretching a band of thermoplastic resin which comprises attenuating a band of unstretched resin, in a forming zone while the resin is in the thermoelastic condition, by passing the band between two surfaces spaced at a distance less than the thickness of said band of unstretched resin while permitting said band to expand in width, and then cooling said band to a temperature below the softening point of the resin while maintaining the dimensions of the attenuated and expanded band; apparatus for performing such a method is also disclosed.

7 Claims, 6 Drawing Figures

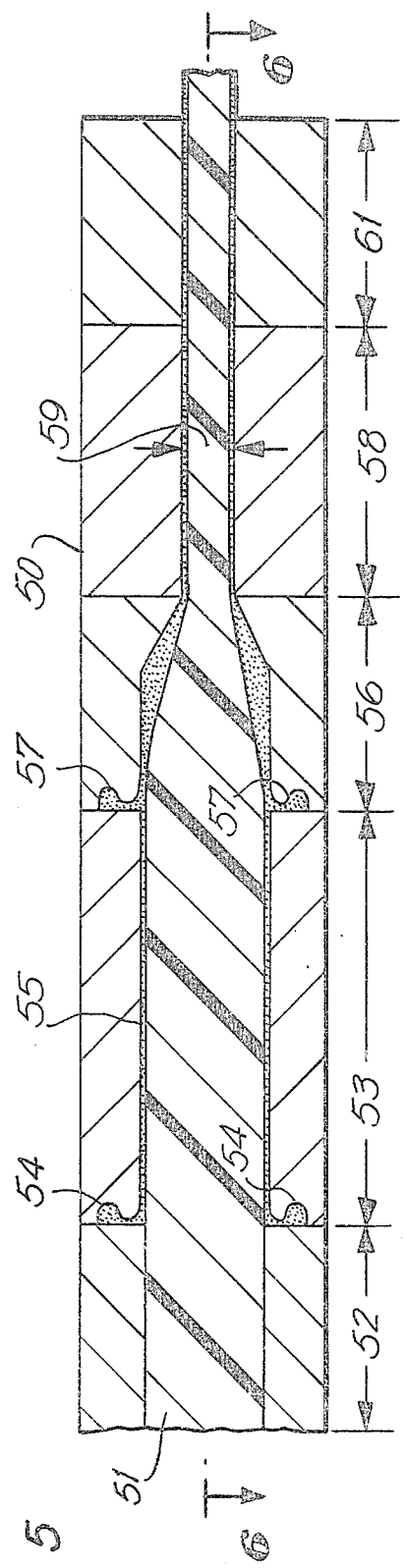
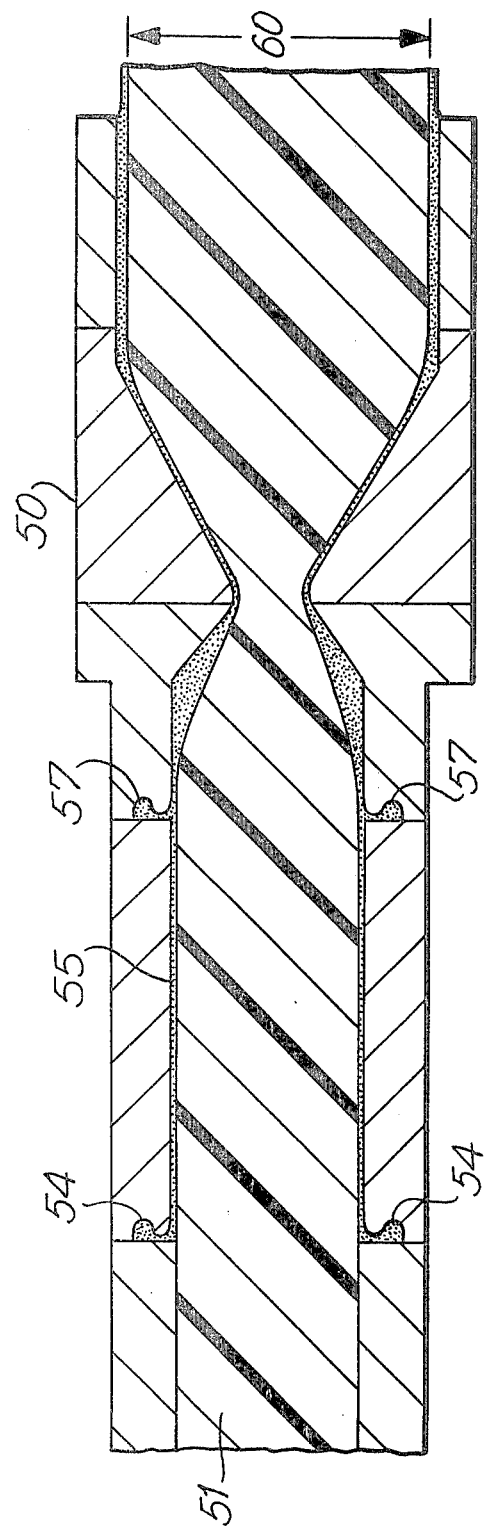
FIG. 5
FIG. 6

METHOD FOR MAKING BIAXIALLY STRETCHED ARTICLES OF THERMOPLASTIC RESIN

The present invention relates to a method and apparatus for making biaxially stretched articles of thermoplastic resin, particularly bands, films, and three-dimensional articles.

The mechanical properties of shaped bodies of thermoplastic synthetic resin are significantly improved by a stretching of the resin. This phenomenon is exploited, for example, in the biaxial stretching of acrylic glass sheets. In the process, the acrylic glass sheet is warmed until it is in a thermoelastic condition and then it is biaxially stretched, for example by 70 percent in all directions, by means of stretching apparatus gripping the edges of the sheet at closely-spaced intervals. By this process, the surface area is increased about three-fold, while the thickness decreases to one-third.

It is also already known in the art to carry out such a stretching process continuously on a continuously-extruded synthetic resin band or film. Thus, for example, German Offenlegungsschrift No. 20 56 697 describes an arrangement with which an extruded synthetic resin band, cooled to the thermoelastic condition, is simultaneously stretched in the extrusion direction and in a direction lateral to the extrusion direction, the latter by means of an extendible gripping chain extending obliquely to the extrusion direction. The band, in the stretched condition, is left to cool below the softening temperature, whereby the biaxial stretching is frozen in. The arrangement necessary for this process is very costly.

U.S. Pat. No. 3,562,383 teaches a method for the preparation of stretched synthetic resin sheets in which a synthetic resin sheet, warmed to the thermoplastic condition, is compressed in a press to a smaller thickness in such a way that the material moves biaxially outwardly. Again, the material is cooled while maintaining the compression pressure, and a biaxially stretched synthetic sheet is obtained. This process cannot be translated into a continuous method of operation.

The object of the present invention is to provide a simple method and a simple apparatus for the continuous biaxial stretching of synthetic resin bands, films, and articles having three dimensions. In the specification and claims, the comprehensive term "band" is employed, which, however, is to be understood as including films and three-dimensional articles of any desired cross-section.

According to the process of the invention for preparing biaxially stretched bands of thermoplastic synthetic resin, an unstretched synthetic resin band is passed through a calibration arrangement which contains a forming zone and a cooling zone. At the end of the forming zone at the latest, the synthetic resin band is passed through limiting surfaces whose separation is smaller than the thickness of the unstretched band in such a manner that the width of the band is increased in comparison with the width of the unstretched band. In the cooling zone, the band is cooled to a temperature below the softening temperature while being kept between limiting surfaces having a constant separation of the aforementioned dimensions. The biaxial thermoelastic stretching achieved in the forming zone is frozen in as a persistent stretching in the cooling zone.

Proceeding from the consideration that the volume, V, of a chosen cross-section of the band remains substantially the same on stretching, it is evident that there is a mathematical relationship which exists between the stretching in the longitudinal and lateral directions, on the one hand, and the decrease in thickness, on the other hand, which relationship can be deduced from the equation $$V = t \cdot l \cdot w = t_s \cdot l_s \cdot w_s,$$

wherein t is the thickness of the unstretched band, w is the width of the unstretched band, l is the length of a given section of the unstretched band, and wherein those expressions having the subscript s represent the corresponding quantities in the stretched condition. This equation is somewhat inexact since a slight volume change is associated with stretching. However, this volume change can be ignored for present purposes. If a non-uniform band, i.e. a three-dimensional article of whatever cross section, is stretched, the relationships deduced above are valid in a corresponding manner for a conceptualized volume segment within the three-dimensional article.

The linear degree of stretching is usually given in percent and corresponds to the expression $$\text{percentage degree of stretching} = \frac{l_s - l}{l} \cdot 100$$

Departing therefrom, in the following equations the relative linear degree of stretching is employed, defined as longitudinal degree of stretching $S_l = l_s/l$ lateral (crosswise) degree of stretching $S_c = w_s/w$.

Preferably, the two degrees of stretching are equally great ($S_l = S_c$). According to the process of the invention, the linear percentage degree of stretching can be chosen to be in the region from 30 to 120 percent, which corresponds to a relative linear degree of stretching of 1.3 to 2.2. For a biaxial stretching of similar magnitude, an increase in surface area from about two-fold to five-fold occurs. For smaller degrees of stretching, the improvements in properties which are sought do not appear to the desired extent.

The thickness of the stretched band is given by the equation $$t_s = t/(S_l \cdot S_c)$$

This thickness is fixed by means of the uniform separation a of the limiting surfaces at the end of the forming zone. If $v_o$ is the velocity of the unstretched band, the band reaches velocity v at the end of the forming zone, where $$v = v_o \cdot S_l.$$

The exit velocity of the stretched band, if it is not attained by the forward movement of the band itself, is adjusted to the aforementioned value by a suitable draw-off arrangement. It is self-evident that the forming zone must have the necessary width or increase in width in the flow direction in order to permit lateral expansion of the band.

The synthetic resin band can be passed through the calibration apparatus in different ways. For example, the band can be drawn off in the frozen condition at the end of the calibration apparatus using draw-off apparatus, for example drawing rolls. Tensile force is transmitted in this way to the band passing through the calibration apparatus.

The force necessary for movement of the band can also be created before entry into the calibration apparatus by means of a pushing arrangement, for example with feed rolls; the band can be warmed in the calibration apparatus to the thermoelastic condition and in the following zone the increase in surface area and subsequent cooling can occur by themselves in the manner described earlier. This mode of operation is employed, for example, if a continuously-formed synthetic resin band is not to be treated but, rather, isolated band segments or sheets. However, the fully continuous method of operation is preferred.

Finally, it is also possible to attach the calibration apparatus pressure-tight to the exit nozzle of an extruder and to cool the extruded synthetic resin strand, in the form of a band, until it is in the thermoelastic state. The hydrostatic pressure of the thermoplastic mass is transmitted to the thermoelastic band as a pushing force which pulses the band through the subsequent zones of the calibration apparatus. Also, the described pushing and pulling arrangements can be used simultaneously.

The external pulling or pushing forces bring about the thermoelastic deformation or stretching which is sought. Very large reaction forces arise at the limiting surfaces of the calibration apparatus and, therefrom, high frictional forces between the synthetic resin band and the calibration apparatus. The friction is suitably overcome by the use of a lubricating agent between the surface of the synthetic resin band and the limiting surfaces. In order to provide a lubricant film of sufficient thickness, the lubricant pressure must be as great as the pressure of the thermoelastic synthetic resin strand at the place where it touches the lubricant film. In the simplest case, this lubricant pressure is created by entrainment-flow which arises from coating the synthetic resin band with lubricant before entry into the calibration apparatus so that the lubricant is drawn into the calibration apparatus with the band. If the necessary lubricant pressure cannot be maintained in this way along the entire path through the calibration apparatus, further lubricant can be pumped in under the necessary pressure in one or more places through openings in the limiting surfaces. In particular, this can be necessary if the synthetic resin band is not completely surrounded on all sides by the limiting surfaces, as is generally necessary for unhindered lateral expansion, and the lubricant can thus flow off on the edges of the band. The lubricant film can have a thickness from about 0.01 mm to 1 mm within the region of lateral stretching. The lubricant film assures good heat transfer between the synthetic resin band and the calibration apparatus.

All liquids which do not disadvantageously alter the properties of the synthetic resin are suitable as lubricants. Low-viscosity lubricants, to which belong materials such as low-viscosity oils, glycerin, or water, have the advantage that they strongly reduce slip resistance but, as a result of leakage currents, can lead to the formation in some places of particularly thin lubricant films having a correspondingly high slip resistance. Lubricant films of uniform thickness and low leakage loss are obtained by using lubricants of higher viscosity, for example those having a viscosity of 1–500 Pa. sec. Exemplary of lubricants of this type are high viscous oils and fats, or aqueous polymer solutions such as are described in German Offenlegungsschrift No. 24 59 306, or solutions of polymers in organic solvents.

The method can be performed with all those synthetic resins which have a region, at certain temperatures above the softening temperature and below the temperature of the thermoplastic condition, in which they are in the thermoelastic condition wherein molecular orientation can be accomplished and frozen in by cooling. This orientation is the real cause of the improvement in properties. The region in which a synthetic resin is in the thermoelastic condition is described in detail by G. Schreyer, "Konstruieren mit Kunststoffen", pages 384–414, 456–492 (1972). For example, polymethylmethacrylate or copolymers containing more than 80% of methyl methacrylate together with other acrylic or methacrylic esters or acrylonitrile or methacrylonitrile, as well as polystyrene, styrene-acrylonitrile copolymers, polyvinylchloride and its impact resistant modifications, polyolefins, polyamides, polyoxymethylene, and thermoplastic polymers belong to the class of synthetic resins which can be used. The named resins comprising methyl methacrylate are preferred. Since the temperature in the stretching zone can be adjusted very exactly, synthetic resins having a very narrow temperature region in which they are thermoelastic can be treated. The resins must not be thermoplastically deformable. For example, a continuously-poured synthetic resin band of polymethylmethacrylate can be used which, because of its high molecular weight or because of cross-linking, is thermoelastic but is not thermoplastic. If the synthetic resin band used is prepared by extrusion, the requirements concerning molecular weight and melt viscosity of the resin are determined in a known fashion according to the conditions of the extrusion. Fundamentally, every synthetic resin material can be viewed as suitable for the process of the invention, the thermoelastic tension of which is not significantly relaxed in the time required between forming and freezing. For a thermoplastic polymethylmethacrylate, the preferred molecular weight region is from 100,000 to 400,000.

The temperature of the synthetic resin band within the forming zone depends on the location of the region in which the material is thermoelastic. A low temperature within this region has the advantage that relaxations can be extensively avoided but simultaneously has the disadvantage that high forming forces must be applied. For polymethylmethacrylate, forming temperature of 130° C.–150° C. are well suited. After forming, the material is cooled within the cooling zone at least to 80° C.

An advantageous shrinking behavior of the synthetic resin band is obtained if the operating temperature is so adjusted that the synthetic resin band, during the stretching process or during a significant portion thereof, is in the thermoelastic condition only in superficial portions and is thermoplastic in core portions thereof. Such a temperature distribution can be realized particularly if the calibration apparatus is directly connected to an extruder and the synthetic resin strand is only superficially cooled prior to stretching. In the thermoplastic core, the stretching tensions relax so that only layers near the surface remain oriented by the stretching. The mechanical properties of such synthetic resin bands uniformly coated with a stretched skin correspond to those of a synthetic resin which has been stretched throughout if they are stressed by elastic bending, since in such a case, in general, tensions only arise in the exterior skin and only slight tensions are generated in the center of the cross section. Synthetic resin bands prepared in this manner tend less to shrink back to their unstretched dimensions at elevated temperatures.

The biaxial stretching according to the method of the invention includes a longitudinal stretching and a lateral stretching of the synthetic resin band. Both stretching processes can be carried out at the same time by passing the synthetic resin band through a calibration zone whose interior height steadily decreases and whose interior width steadily increases and wherein the increase in width and the decrease in height are so adjusted with respect to the other that the free cross-sectional area steadily decreases. Simultaneous biaxial stretching is also possible if the forming zone is so constructed that the indicated dimensional changes pertain only to the synthetic resin band, while the interior width of the forming zone can be greater than the width of the band. In this case, care must be taken that the lubricating film is not too strongly diminished by leakage currents in the free space adjacent the synthetic resin band.

However, longitudinal stretching and lateral stretching can be carried out separately from one another, in which case it is preferred first to stretch in the longitudinal direction and thereafter in the lateral direction. Stretching in the longitudinal direction can take place in a manner known per se, for example by means of drawing rolls, whereupon the monoaxially stretched band is cooled under the softening temperature and is then introduced into the calibration apparatus in which it is again warmed to a thermoelastic condition prior to forming. In the monoaxial pre-stretching, the degree of longitudinal stretching desired in the final product is suitably exceeded to such an extent that the deformation energy necessary for the subsequent lateral stretching is already frozen into the monoaxially pre-stretched strand. The synthetic resin band is heated to a thermoelastic condition in a calibration zone having a constant separation of the limiting surfaces, whereupon the thermoelastic forces compensate in such a fashion that a portion of the longitudinal stretching is transformed into a lateral stretching with broadening of the band.

A particularly advantageous method for longitudinal stretching comprises letting a lubricant work on all sides of the thermoelastic synthetic resin band with such hydrostatic pressure that the synthetic resin band stretches in the longitudinal direction with attenuation. The synthetic resin band can then be further led into a lateral stretching zone of the type mentioned above without an intermediate cooling.

In addition to these preferred embodiments, numerous other method variants can be formulated which can be characterized by a different sequence of the longitudinal and lateral stretching processes and in which the driving forces for the synthetic resin band can be brought into effect by different ways and means.

A better understanding of the present invention and of its many advantages will be had by referring to the accompanying drawings, in which FIGS. 1-6 show advantageous embodiments for carrying out the process of the invention, for example for the biaxial stretching of polymethmethacrylate by 70 percent along each stretching axis.

More particularly, FIG. 1 is a side elevation, in section, of a forming apparatus for effecting the simultaneous longitudinal and lateral stretching of a band or ribbon of synthetic resin;

FIG. 5 is side elevation, in section, of a forming apparatus in which longitudinal stretching is carried out first and, subsequently, lateral stretching is performed; and FIG. 6 is a plan view of the apparatus of FIG. 5, in section taken along line 6—6 of FIG. 5:

Figure 1:
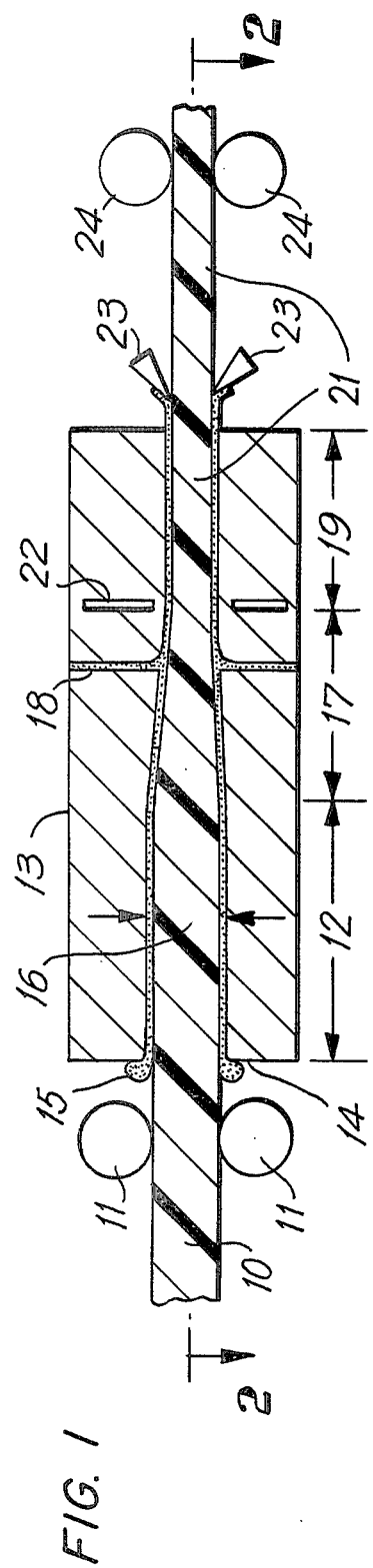
Figure 4:
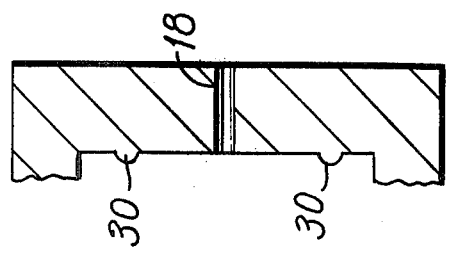
FIG. 4 is a front elevation of a calibration arrangement forming part of the apparatus of FIGS. 1-3, in section taken along line 4—4 of FIG. 3.

FIG. 1 shows strip or band 10 of a synthetic resin in its glassy state (that is at a temperature below its softening temperature) introduced through by driving rolls 11 into tempering zone 12 of forming apparatus 13, which also comprises forming zone 17 and cooling zone 19. At entry mouth of 14 of tempering zone 12, lubricant 15 is applied to the surfaces of band 10 by suitable means (not shown). In tempering zone 12, whose interior height 16 is constant and corresponds to the thickness of entering synthetic resin band 10, including film of lubricant 15, band 10 is heated to about 140° C. (for polymethylmethacrylate). In following forming zone 17, the internal height decreases constantly to about ⅓ of its original value. Simultaneously, the internal width of band 10 increases to about 1.7-fold its original width 20 (see FIG. 2) in tempering zone 12. Forming zone 17 is held uniformly at 140° C. (again suitably for polymethylmethacrylate). Stretching in the lateral direction is made easier and streaming off of lubricant 15 to the sides is reduced if the inner boundary surfaces of the calibration apparatus have, in forming zone 17, a flat bow-shaped protuberance 30 (see FIGS. 3 and 4) or a similar shaped structure. It can be expedient to pump in new lubricant in the region of forming zone 17 through one or more conduits 18 in order to compensate for loss by leakage. Lubricant which is expressed at the edges at the exit end of forming zone 17 can be led off through conduits 31.

Biaxially stretched band 21 emerges from forming zone 17 into cooling zone 19 which is cooled, for example to 30° C. and from which the synthetic resin band emerges with a temperature of at most 80° C. Cavity 22 is suitably introduced as a thermal barrier between cooling zone 19 and forming zone 17 to insulate one from the other. The interior height and breadth of cooling zone 19 remains constant and corresponds with the dimensions at the exit from forming zone 17.

On exiting from cooling zone 19, the biaxially stretched synthetic resin band is freed of its lubricant film with wiping and/or washing arrangement 23. The washing step can be omitted if the synthetic resin band, before entry into the forming zone, is coated with a protective film or foil which is stretched together with the band. If water, or a polymer solution in water, or a volatile solvent is employed as the lubricant, the lubricant film or the residue thereof remaining after wiping can be dried by radiant heat or hot air. The cooled band, freed of liquid lubricant, can be drawn off with draw rolls 24 and led to a wrapping or cutting apparatus.

FIGS. 5 and 6 show apparatus 50 for performing the stretching processes in two stages. The description of the apparatus is again specifically referred to a biaxial stretching of polymethylmethacrylate by 70 percent along two axes. Synthetic resin band 51 to be stretched is produced by means of extrusion nozzle 52 and is cooled to the thermoelastic condition, i.e. to 140° C., in tempering zone 53. The pressure of the extruded mass on exit from extrusion nozzle 52 is about 20 atmospheres. In the region of tempering zone 52, a film of lubricant is applied to the surface of band 51 from groove 54 which surrounds the band. The amount of lubricant is constantly so dosed that thin film 55 of lubricant is formed. In stretching zone 56, the amount of lubricant is constantly maintained by conduit 57 in an amount such that synthetic resin band 51 attenuates to 35 percent of its original width and thickness and its velocity in the direction of movement is correspondingly increased, whereby band 51 is monoaxially stretched in the longitudinal or machine direction. Spreading zone 58, adjacent stretching zone 56, has interior height 59 corresponding to the thickness of the band emerging from stretching zone 56, inclusive of the lubricant film thereon. In spreading zone 58, the band velocity is again slowed because the band expands sidewards to breadth 60 corresponding to the elastic energy stored therein. In following cooling zone 61, having the same interior height 59 and breadth 60, the band is cooled to about 30° C. The removal of lubricant and the drawing off of the bi-axially stretched band follow in the same manner as for the apparatus shown in FIGS. 1 and 2.

Figure 2:
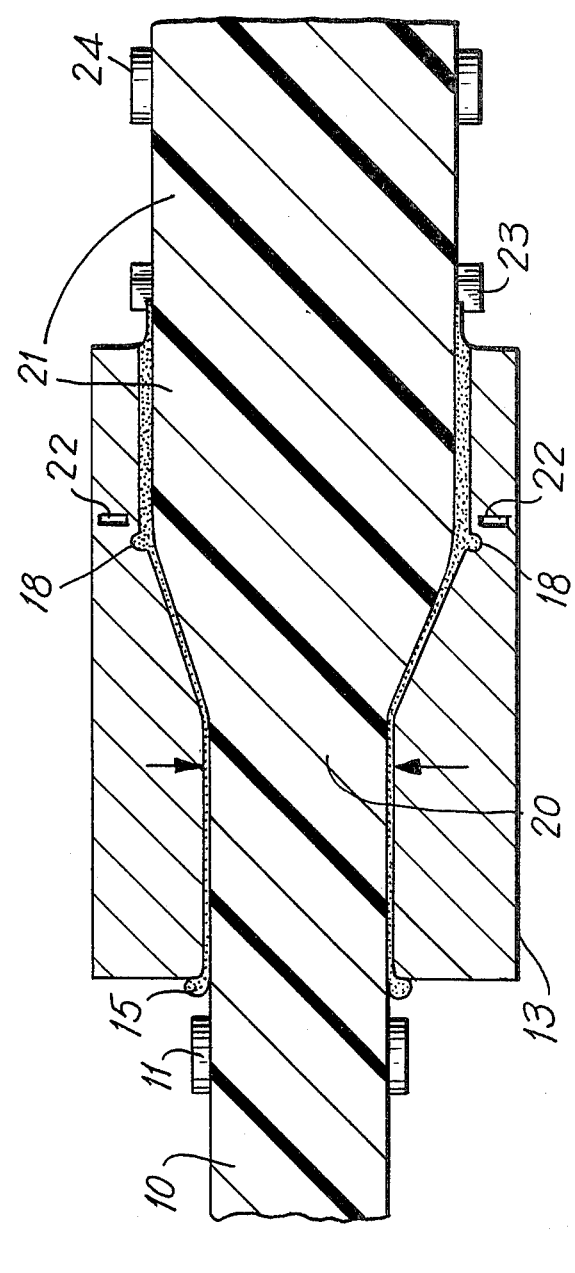
FIG. 2 is a plan view of the apparatus in FIG. 1, in section taken along line 2—2 of FIG. 1, also showing the stretching of a synthetic resin band.
Figure 3:
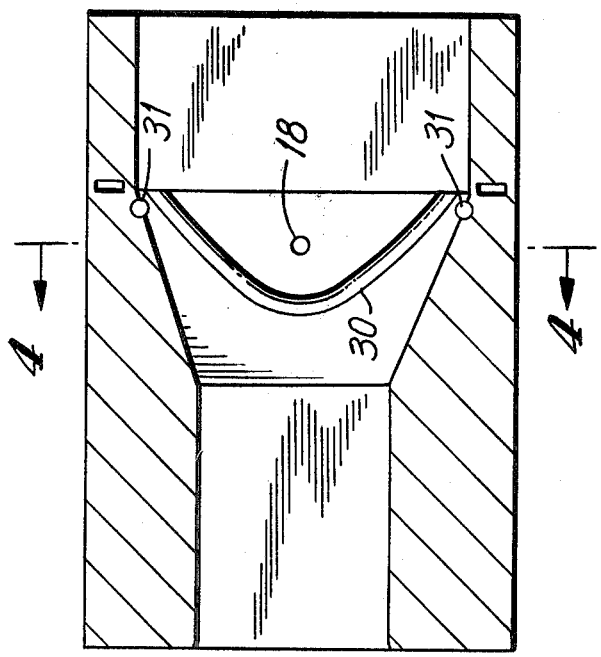
FIG. 3 is another plan view of the apparatus shown in FIG. 3 which omits the synthetic resin band.

If a corrugated resin band or a band having some other shaped surface is to be prepared, a corresponding corrugating or shaping channel (not shown) is interposed between stretching zone 17 of FIGS. 1 and 2 or spreading zone 58 of FIGS. 5 and 6 and respectively following cooling zones 19 or 61. In such a corrugating or shaping zone, the previously planar stretched band can, for example, be formed into a sinusoidal or trapezoidal wave. The stretching and the corrugation or shaping are subsequently simultaneously frozen in the cooling zone. In principle, it is of course possible to stretch non-planar synthetic resin bands or synthetic resin bands of variable thickness biaxially according to the process of the invention.

The apparatus and methods described above for biaxial stretching presuppose that the unstretched band is treated while in a horizontal position, i.e. that the thickness of the band is its vertical dimension. However, it should be understood that the band can also be stretched while in a vertical orientation, i.e. with its thickness being its width. In the latter case, the descriptions given earlier herein must be read while replacing reference to "height" by references to "width" and vice versa.

What is claimed is:

1. A method for biaxially stretching a band of thermoplastic resin by 30 percent to 120 percent in each axial direction which comprises attenuating a lubricated band of unstretched resin, in a forming zone while the resin is in the thermoelastic condition, by passing the lubricated band between two surfaces spaced at a distance less than the thickness of said band of unstretched resin while permitting said band to expand in width, and then cooling said band to a temperature below the softening point of the resin while maintaining the dimensions of the attenuated and expanded band.

2. A method as in claim 1 wherein the spacing between said surfaces, a, is defined by $$a = t/(S_l \cdot S_c)$$

and the velocity of the attenuated band is defined by $$v = v_o \cdot S_l$$

where
t = the thickness of the unstretched band
$v_o$ = the velocity of the unstretched band
$S_l = 1/l_s$ (quotient of the length of a band segment before and after stretching)
$S_c = w/w_s$ (quotient of the width of a band segment before and after stretching)

3. A method as in claim 1 wherein said resin band is moved through said forming zone by forces applied in the direction of band movement through said forming zone to a portion of the resin band which is at a temperature below the softening point of the resin.

4. A method as in claim 1 wherein said resin band is moved through said forming zone by pressure exerted thereon by a portion of the resin band which is in a thermoplastic condition.

5. A method as in claim 1 wherein said band is lubricated with a 0.1 to 10 percent aqueous solution of a water-soluble polymer.

6. A method as in claim 1 wherein said thermoplastic resin is a polymethylmethacrylate or a copolymer comprising at least 80 percent by weight of methyl methacrylate.

7. A two-step method for biaxially stretching a band of thermoplastic resin by 30 percent to 120 percent in each axial direction which comprises a first step of reducing the cross sectional area of a lubricated band of unstretched resin by attenuating the thickness and decreasing the width of said band while said resin is in the thermoelastic condition, whereby said band is stretched in its longitudinal direction, and a subsequent second step of permitting said band to expand to a width greater than its original width while maintaining the attenuated thickness of said band, and then cooling said band to a temperature below the softening point of the resin while maintaining the dimensions of the attenuated and expanded band.

* * * * *